United States Patent [19]
Kalitta

[11] 3,851,909
[45] Dec. 3, 1974

[54] VEHICLE BUMPER CONSTRUCTION AND METHOD OF MAKING SAME

[75] Inventor: Carl L. Kalitta, Adrian, Mich.

[73] Assignee: Dura Corporation, Southfield, Mich.

[22] Filed: Feb. 1, 1973

[21] Appl. No.: 328,766

Related U.S. Application Data

[62] Division of Ser. No. 237,711, March 24, 1972, Pat. No. 3,790,200.

[52] U.S. Cl.......................... 293/70, 29/460, 29/482
[51] Int. Cl......................... B60r 19/00, B60r 21/14
[58] Field of Search .......... 29/460, 482; 293/69, 71, 293/70, 98, 1, 60

[56] References Cited
UNITED STATES PATENTS

| | | | |
|---|---|---|---|
| 1,917,267 | 7/1933 | Lyon | 29/460 |
| 2,445,268 | 7/1948 | Hodgins | 29/460 UX |
| 2,492,914 | 12/1949 | Barden | 293/69 R X |
| 2,544,525 | 3/1951 | Cadwallader | 29/482 X |
| 2,604,349 | 7/1952 | Martinetz | 293/98 X |
| 2,649,308 | 8/1953 | Bice | 293/69 R X |
| 3,246,794 | 4/1966 | Marshall | 29/482 X |
| 3,427,062 | 2/1969 | Struben | 293/98 X |
| 3,574,406 | 4/1971 | Wessells | 293/71 |
| 3,650,558 | 3/1972 | Eggert | 29/155 R X |
| 3,684,311 | 8/1972 | Pierce | 280/152 R |
| 3,698,609 | 10/1972 | Lund | 293/69 X |

Primary Examiner—Charlie T. Moon
Attorney, Agent, or Firm—Hill, Gross, Simpson, Van Santen, Steadman, Chiara & Simpson

[57] ABSTRACT

A vehicular bumper construction has a bumper bar offset to form a trough for receiving the mating portions of a platform member. The parts are joined by welds, the complete assembly is painted and the remaining portions of the trough are filled with a sealer having the same color as the finished paint coat whereby a waterproof sealer is provided between the bar member and the platform member to prevent bleeding of rust onto the show surface of the construction.

4 Claims, 6 Drawing Figures

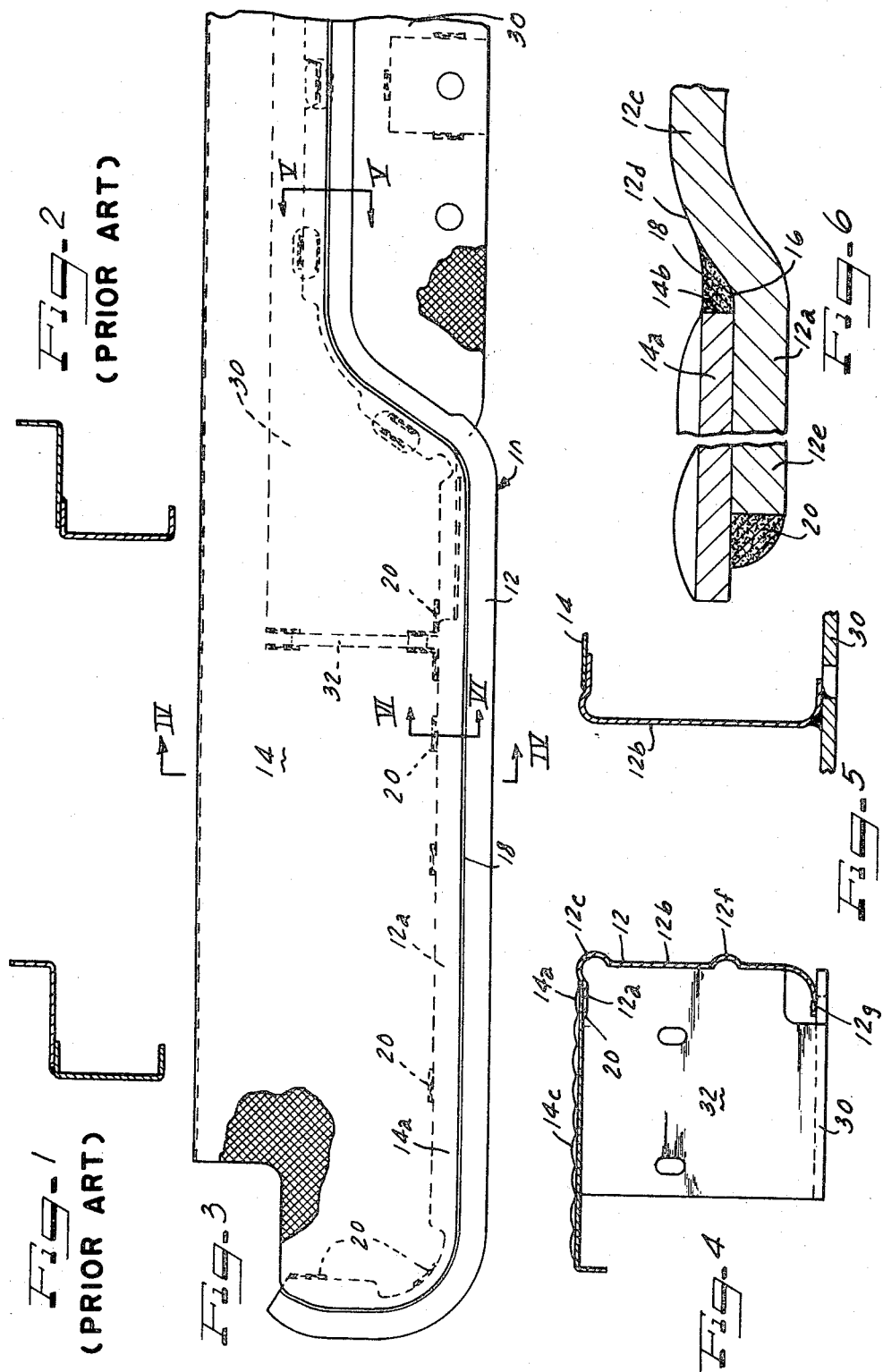

VEHICLE BUMPER CONSTRUCTION AND METHOD OF MAKING SAME

This is a division of application Ser. No. 237,711 filed Mar. 24, 1972 which issued as U.S. Pat. No. 3,790,200 on Feb. 5, 1974.

BACKGROUND OF THE INVENTION

1. Field of the Invention

This invention generally relates to a vehicle bumper construction and more specifically concerns an advantageous joinder of a bumper bar member and a platform member used in commercial vehicle step bumpers whereby the problem of rust forming on the normally visible portions of the bumper bar is eliminated.

2. Prior Art

The appearance of motor vehicles during their useful life has always been a primary concern of automobile manufacturers. Many millions of dollars are expended each year to provide pleasing designs for motor vehicles. Moreover, the importance of the design for commercial vehicles is also being given close attention by manufacturers. For example, it is no longer acceptable for trucks and recreational vehicles to show premature unappealing signs of wear and age. One of the conditions considered unappealing is the formation of rust either directly or the stain of rust from a hidden source.

Prior to my invention particulary acute problems of rust and rust stain occurred in the bumpers of commercial vehicles where a step platform made of steel treadplate was attached to the main bumper bar by arc welding. As shown in FIG. 1 previous designs attempted to solve this problem by laying a bead of weld along the top edge of the entire length of the platform at its intersection with the channel-shaped bumper bar. This, however, did not solve the problem because it required the use of a weld flux wire that deposited a layer of slag on top of the weld bead. It was impossible to remove all of this slag and consequently after a brief period of use this slag would chip off and the underlying weld would start rusting to create the unappealing appearance.

In another attempt to solve the problem a solid weld was laid between the inside edge of the channel-shaped bumper bar and the platform as shown in FIG. 2. Because of the heat generated by the welding process paint is not applied to the mating surfaces prior to welding with the result that the overlapping surfaces are substantially unprotected by any later applied paint so that when moisture got between the two surfaces it would start bleeding rust down over the bumper. In an attempt to eliminate the rust problem the mating overlapping surfaces were coated with a paint primer, the platform member was tack welded to the bar member along the inside edge of the bumper and then the entire inside edge was sealed with a vinyl sealer. Because a certain amount of paint is burned away in the immediate area of the weld and because moisture condenses wherever air can reach metal the problem continued.

SUMMARY OF THE INVENTION

The problems of the prior art have now been completely overcome by the vehicle bumper construction of my invention wherein an upper lip on the bar member extending generally parallel to the plane of the platform member is offset below the corner of the bar member so that when the platform edge portion is positioned in overlapping relationship to the lip a trough is formed between the platform edge and a shoulder of the lip offset which trough receives a continuous seal along its length. The platform member may be joined or rigidly connected to the bar member by means of tack welds between an inside edge of the offset lip portion and the bottom of the platform at spaced locations along the length of the overlapping members. With this construction I have found that the problem of rust and rust stain is completely eliminated while at the same time the appearance and appeal of the bumper are improved.

The bumper bar member and the platform member are retained in generally angularly disposed relationship to one another, however, the upper channel leg or lip is offset below the corner of the bumper bar channel and the platform member is laid on the lip with its inner edge spaced from the offset shoulder to form a trough. The offset of the lip may be a distance generally equal to the thickness of the platform edge portion so that the treads on the platform will be generally in line with the corner.

Suitable joints such as tack welds between an inner edge of the lip and the bottom of the platform may be effected at spaced locations along the length of the overlapping members to provide a strong and economical construction. According to the method of my invention the complete assembly is painted after the joining step and subsequently the trough is filled with a sealer such as a silicone sealer, for example, having the same color as the finished paint coat. As a result, the bumper has and maintains a very appealing appearance that is extremely acceptable to both buyers and manufacturers.

In the illustrated embodiment of my invention the channel member is shown having a bulbous corner construction wherein the shoulder of the lip offset smoothly joins the bulbous corner configuration.

BRIEF DESCRIPTION OF THE DRAWINGS

Other objects, features and advantages of my invention will be readily apparent from the following description of certain preferred embodiments thereof, taken in conjunction with the accompanying drawings, although variations and modifications may be effected without departing from the spirit and scope of the novel concepts of the disclosure and in which:

FIGS. 1. and 2 illustrate prior art attempts to solve the rust and rust bleeding problem overcome by the invention herein;

FIG. 3 is a plan view of approximately one-half of a typical bumper construction illustrating the platform member lying on the offset lip and one means of joining these member;

FIG. 4 is a cross-sectional view taken along the lines IV—IV in FIG. 3;

FIG. 5 is a partial cross-sectional view taken along the lines V—V in FIG. 3; and, FIG. 6 is a greatly enlarged cross section of the joint between the platform member and the bar member taken along the lines VI—VI in FIG. 3.

DESCRIPTION OF THE PREFERRED EMBODIMENT

A vehicle bumper construction generally indicated at 10 at FIGS. 3, 4 and 5 comprises a bumper bar member 12 and a platform member 14 generally disposed in angular relationship to one another and having overlapping side edge portions 12a, 14a respectively. The bar member 12 includes a body portion 12b which includes generally the vertically extending portions as shown in FIGS. 4 and 5. The side edge portion or lip 12a and the body portion 12b intersect each other and an angle of approximately 90° and are interconnected to each other to form a corner means 12c. As shown the corner means 12c is bulbous and projects generally beyond the plane of the main portion of the body portion 12b.

The lip 12a is offset below the corner means 12c a distance at least generally equal to the thickness of the platform edge portion 14a to form a trough 16, as may be best seen in the enlarged cross-sectional view of FIG. 6 between the platform edge 14b and a shoulder 12d formed by the offsetting of the lip. Thus, the trough 16 is between the edge of the platform 14 and the corner means 12c.

The platform member 14 and the bar member 12 are rigidly secured by means such as welds 20 between the edge 12e of the bar member 12 and the underside of the platform 14. As may be seen in FIG. 3 the welds 20 are spaced along the length of the joint between the two members 12 and 14 as required to assure a secure connection. The bar member 12 may be of steel plate of suitable thickness and strength and may include ribs such as illustrated in FIG. 4 at 12f and may have an inturned lower edge as shown at 12g. The platform member 14 also may be a steel plate with suitable tread structure 14c fashioned on the upper surface thereof to meet the expected requirements of usage.

According to the method of my invention the offset is formed in the lip of the bar 12 and the bare metal members 12 and 14, which has a substantially planar portion, are brought together with the edge portion 14a over lapping the offset lip 12a and the tack weld 20 is effected between the edge 12e and the underside of the platform member 14 as required along the length of the structure 10. The edge 14b of the platform member 14 is spaced from the shoulder 12d to allow a trough 16 to be formed therebetween. As shown in FIG. 6 the shoulder 12d has a generally bulbous corner means 12c with the shoulder 12d forming a smooth and continuous intersection with the corner means to provide a strong, esthetically pleasing appearance. After this operation additional means such as a step and hitch plate 30 and base member 32 have been attached to the bumper construction as required the entire construction 10 is painted with at least one and usually two or more coats of paint are required. After the last or finish coat of paint has been applied and suitably set, the trough 16 is filled with an air cure sealer such as a sealing means 18 along its length. The sealing means may advantageously be a silicone sealer and will have the same color as the finished paint coat so that a very smooth, esthetically pleasing joint will result.

From the foregoing description of my invention it may be seen that the problem of rust formation and the bleeding of rust on the normally visible portions of the bumper construction 10 have been completely eliminated. Thus, with my construction and method the sealing means 18 forms an economical, tough and durable seal which prevents rust from bleeding onto the show surface of the bumper construction. The trough 16 moreover serves to protect the seal 18 and prevent wear in this area.

Although minor modifications might be suggested by those versed in the art, it should be understood that I wish to embody within the scope of the patent warranted hereon all such modifications as might reasonably and properly come within the scope of my contribution to the art.

I claim:

1. A method of constructing a bumper having a bar member which has a body portion with a lip extending at an angle to the body portion and a platform member secured to a portion of the lip comprising the steps of forming an offset at a free edge of the lip to provide a shoulder spaced from the free edge of the lip,
   positioning an edge portion of said platform member in overlapping relation on said offset to form a trough between an edge of said platform member and the shoulder of said offset,
   rigidly securing said bar member and said platform member to form an assembled bumper,
   applying at least one coating of protective material to the assembled bumper, and
   filling the trough with a sealer having the same color as the last applied coating of protective material so that rust which may form between the offset and overlapping platform is prevented from bleeding onto a show surface of the bumper.

2. A method according to claim 1, wherein said step of rigidly securing includes
   welding said platform member to said free edge of said lip of the bar member at locations spaced along the length of said lip.

3. A vehicle bumper assembly comprising;
   a bumper bar having a body portion and a lip extending at an angle thereto, said lip at a free edge having an offset to provide a shoulder spaced from the free edge,
   a platform having an edge portion being positioned in overlapping and mating relationship with the offset with an edge of the edge portion being spaced from the shoulder to form a trough,
   tack weldments retaining said lip and platform in firm assembly,
   a coating of protective material covering the exposed surfaces of the assembly and
   an air cured sealer filling the trough and sealing the mating surfaces between the platform and offset so that any rust developing therebetween is prevented from bleeding onto a show surface of the assembly.

4. A method of making a bumper assembly having a bar member which has a body portion with a lip extending at an angle to form a corner means therebetween, and a platform secured to a portion of the lip comprising the steps of
   offsetting an edge of the lip portion to form an offset having a shoulder spaced between the edge of the lip and the corner means,
   positioning an edge portion of the platform on said lip in overlapping relation to said offset to form a trough between an edge of the platform and the shoulder of the offset,
   tack welding an edge of the lip to the platform at locations spaced along the lip to rigidly form an assembled bumper, and
   subsequently filling the remaining portion of the trough with an air cured sealer to prevent rust which may form between the overlapping edge portion and offset from bleeding onto the show surfaces.

* * * * *